United States Patent [19]
Terashima

[11] Patent Number: 5,909,246
[45] Date of Patent: Jun. 1, 1999

[54] IMAGE SENSING DEVICE AND METHOD OF ADJUSTING QUANTITY OF LIGHT

[75] Inventor: Takashi Terashima, Kanagawa, Japan

[73] Assignee: Sony Corporation, Tokyo, Japan

[21] Appl. No.: 08/764,451

[22] Filed: Dec. 12, 1996

[30] Foreign Application Priority Data

Dec. 25, 1995 [JP] Japan .................................. 7-336374

[51] Int. Cl.⁶ .............................. H04N 3/14; H04N 5/235
[52] U.S. Cl. .......................... 348/298; 348/229; 348/296; 348/364
[58] Field of Search .................................. 348/312, 228, 348/229, 296, 297, 298, 299, 362, 367; H04N 5/235, 3/14

[56] References Cited

U.S. PATENT DOCUMENTS

| | | | |
|---|---|---|---|
| 4,202,014 | 5/1980 | Gilligan et al. | 358/228 |
| 4,388,526 | 6/1983 | Schroeder | 250/214 R |
| 4,623,927 | 11/1986 | Hoshino | 358/213 |
| 4,769,693 | 9/1988 | Kato | 358/42 |
| 4,907,089 | 3/1990 | Yamaguchi et al. | 358/213.31 |
| 5,184,006 | 2/1993 | Ueno | 250/208.1 |
| 5,227,834 | 7/1993 | Ishida et al. | 354/402 |
| 5,268,567 | 12/1993 | Bowlby, Jr. et al. | 250/208.1 |
| 5,638,120 | 6/1997 | Mochizuki et al. | 348/296 |

Primary Examiner—Wendy Garber
Assistant Examiner—Jacqueline Wilson
Attorney, Agent, or Firm—Jay H. Maioli

[57] ABSTRACT

In a frequency dividing circuit, a VD pulse is generated as a vertical synchronization signal on the basis of the bus clock inputted from an external circuit, while in the gate circuit, integral circuit, gate circuit and hold circuit, the frequency of bus clock is detected on the basis of the VD pulse. Moreover, in the PWM circuit, when the frequency of the bus clock is high or low, a shutter drive pulse having the width shorter or longer than that in the related art is generated, respectively. The electronic shutter driver closes the electronic shutter of the CCD imager (charges generated in the CCD imager are discharged) for the period corresponding to the shutter drive pulse. Thereby, the discharging period in the CCD imager is fixed to a constant period without relation to the frequency of the bus clock. Accordingly, an image having adequate luminance can be obtained by the so-called multi-scan type image sensing device.

10 Claims, 10 Drawing Sheets

TWO PRIMARY COLOR VERTICAL STRIPE FILTER $R_1$ $G_1$ $B_1$ $R_2$ $G_2$ $B_2$ - - - - - - -

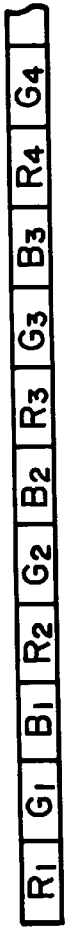
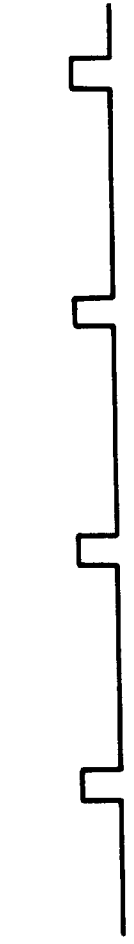
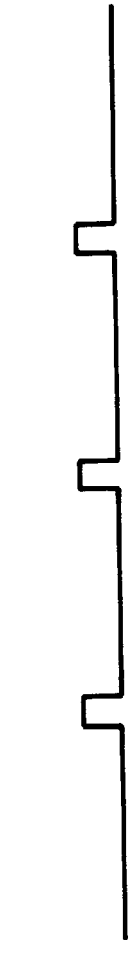
F I G. 6A  SYSTEM CLOCK (BUS CLOCK)
F I G. 6B  OUTPUT OF A/D CONVERTER 6
F I G. 6C  R DATA SAMPLING CLOCK
F I G. 6D  OUTPUT OF R DATA TIMING ADJUSTING CIRCUIT 7R
F I G. 6E  G DATA SAMPLING CLOCK
F I G. 6F  OUTPUT OF G DATA TIMING ADJUSTING CIRCUIT 7G
F I G. 6G  B DATA SAMPLING CLOCK
F I G. 6H  OUTPUT OF B DATA TIMING ADJUSTING CIRCUIT 7B

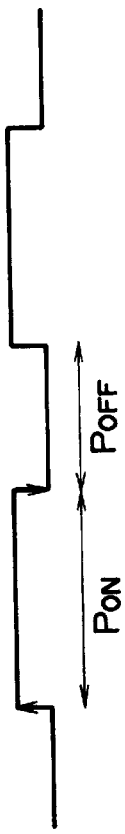
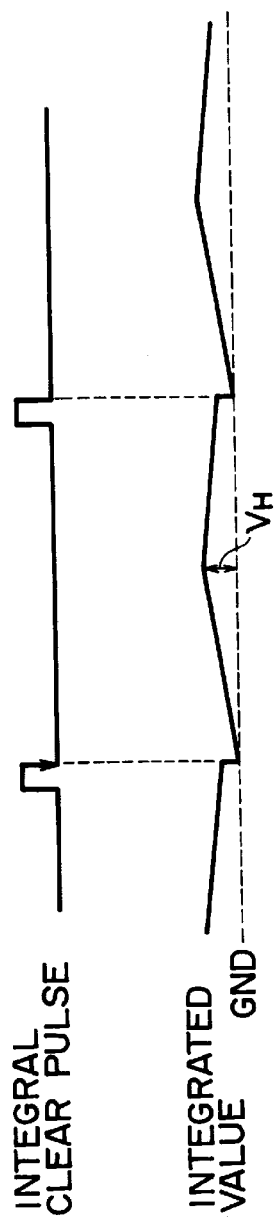
FIG. 7A  GATE PULSE
FIG. 7B  VD PULSE
FIG. 7C  INTEGRAL CLEAR PULSE
FIG. 7D  INTEGRATED VALUE
FIG. 7E  HOLD TRANSFER PULSE
FIG. 7F  HOLD VALUE

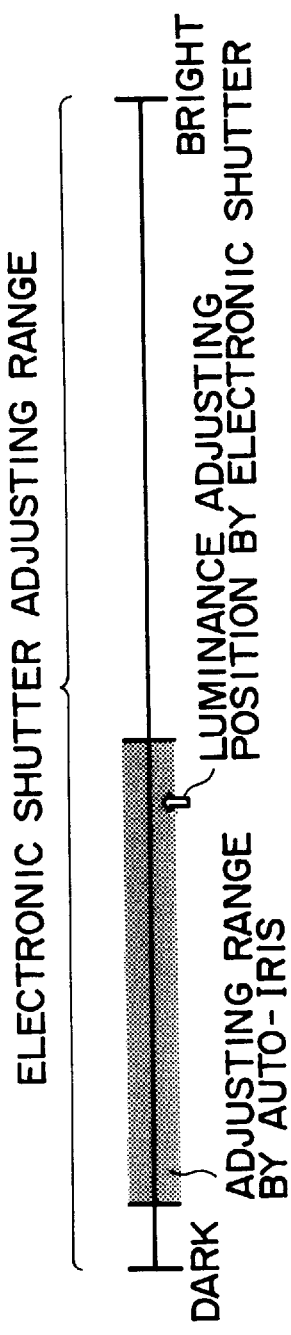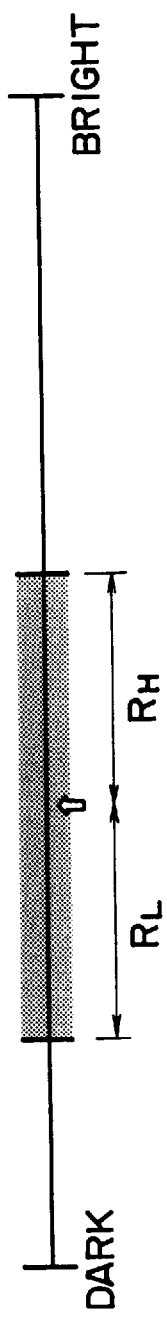
FIG. 8A
FIG. 8B

IMAGE SENSING DEVICE AND METHOD OF ADJUSTING QUANTITY OF LIGHT

BACKGROUND OF THE INVENTION

1. Field of the Invention

The present invention relates to an image sensing device and a method of adjusting a quantity of light and particularly to an image sensing device and a method of adjusting a quantity of light for sensing an image by driving, for example, an imager utilizing a CCD (Charge Coupled Device) with clocks of various frequencies to be inputted externally.

2. Description of Related Art

A so-called multi-scan type image sensing device has been proposed as an apparatus for sensing an image by driving an imager (CCD imager) utilizing a CCD with clocks of various frequencies to be inputted externally.

FIG. 10 shows an example of the structure of such as multi-scan type image sensing device. The light from an object to be picked up is incident to a lens 1 and is then received at the receiving surface of a CCD imager 3 via an iris 1A and a primary colors vertical stripe filter 2. At the light receiving surface of the CCD imager 3, a photosensor, for example, is formed and this photosensor generates charges, through photoelectric conversion, corresponding to the quantity of light received at the light receiving surface. The CCD imager 3 is driven by a driver 14 to sequentially transfer charges generated by the photosensor and moreover to convert such charges into an image signal (analog signal) as an electrical signal. This image signal is supplied to an S/H (Sample/Hold) circuit 5 after level adjustment in an AGC (Automatic Gain Controller) 4.

Here, the CCD imager 3 is designed to generate an image signal corresponding to an image, for example, of 811×508 pixels (number of pixels in the horizontal direction×number of pixels in the vertical direction) and an image displayed in field units (525/2 scanning lines) by the so-called interlaced scanning.

The S/H circuit 5 samples and holds the image signal from the AGC 4 and outputs such an image signal to an A/D converter 6 depending on the predetermined system clock supplied, for example, from an external apparatus such as a personal computer via a driver 14. The A/D converter 6 converts the image signal sampled and held by the S/H circuit 5 to the digital data of 8 bits, for example, by the A/D converting method depending on the system clock. This digital data is then supplied to a chromaticness simultaneous processing circuit 7. Here, since the light received by a CCD imager 3 is applied via the primary colors stripe filter 2, the color signals corresponding to three primary colors of the red (R), green (G) and blue (B) lights from the CCD imager 3 are outputted as the image signals. In this case, the red, green and blue color signals are outputted, for example, in the sequence of red, green, blue, red, . . . Therefore, the color signals supplied in this sequence are also outputted as the digital data in this sequence through AGC 4, S/H circuit 5 and A/D converter 6. Accordingly, the chromaticness simultaneous processing circuit 7 adjusts the output timing of the color signals of red, green and blue (so-called RGB) and simultaneously outputs such signals as a set of signals.

Namely, the chromaticness simultaneous processing circuit 7 is composed of an R data timing adjusting circuit 7R, a G data timing adjusting circuit 7G and a B data timing adjusting circuit 7B and when those obtained by converting the red, green or blue color signals into digital data with A/D converter 6 are defined respectively as R data, G data or B data, the R data timing adjusting circuit 7R, G data timing adjusting circuit 7G or B data timing adjusting circuit 7B respectively adjust the output timing of R data, G data or B data and simultaneously output respective outputs. These R data, G data and B data are supplied, for example, to external apparatus such as a personal computer and are then rendered for viewing by predetermined image processing.

Meanwhile, the system clock from an external apparatus is supplied, as explained above, not only to the A/D converter 6 and driver 14 but also to a frequency dividing circuit 8. The frequency dividing circuit 8 also has counters 9 to 11 and generates signals for giving various timings by dividing the system clock with the predetermined frequency dividing ratio.

That is, the system clock inputted to the frequency dividing circuit 8 is supplied to a counter 9. The counter 9 counts up the system clock and resets, when the count value becomes 3, the count value and outputs the pulse of the predetermined width (the width, for example, equal to the pulse width of the system clock). The counter 9 repeats the operation explained above. Therefore, the counter 9 outputs the clock (hereinafter referred to as ⅓ system clock) obtained by dividing the frequency of the system clock by ⅓.

The ⅓ system clock is supplied to the chromaticness simultaneous processing circuit 7. In this circuit, the output timings of the R data, G data and B data are adjusted on the basis of this ⅓ system clock. Moreover, this ⅓ system clock is also supplied to a counter 10. In the counter 10, the operation similar to that in the counter 9 is performed and thereby the ⅓ system clock is divided, for example, to 3/910 and is then outputted. Therefore, the counter 10 outputs the clock obtained by dividing the system clock to 1/910 (=⅓× 3/910).

Here, the period of the clock (obtained by dividing the system clock to 1/910) outputted from the counter 10 corresponds to the length of one line (one horizontal scanning line) of the image signal outputted from the CCD imager 3. Therefore, this clock gives the horizontal scanning period for driving the CCD imager 3 and accordingly it is called as the HD (Horizontal Drive) pulse.

The HD pulse is supplied to a counter 11 and a driver 14. The counter 11 divides the HD pulse, for example, to 2/525 to output to the driver 14 by the operation similar to that in the counter 9.

Here, the period of pulse outputted from the counter 11 corresponds to one field (525/2 lines) of the image signal outputted from the CCD imager 3. Therefore, this pulse gives the vertical scanning period (field period) for driving the CCD imager 3 and accordingly it is called as the VD (Vertical Drive) pulse.

The driver 14 drives the CCD imager 3 depending on the system clock, HD pulse and VD pulse. Moreover, the driver 14 controls the S/H circuit 5 depending on the system clock.

The frequency dividing circuit 8 also generates and outputs the horizontal blanking signal (/H.BLK) and vertical blanking signal (/V.BLK) in addition to the ⅓ system clock, HD pulse, VD pulse. A manual iris adjusting mechanism 51 is operated for adjusting luminance of the image signal outputted from the CCD imager 3. That is, when the manual iris adjusting mechanism 51 is operated, an operation signal corresponding to such operation is supplied to an iris drive circuit 52. The iris drive circuit 52 drives, upon reception of the operation signal from the manual iris adjusting mechanism 51, the iris 1A corresponding to such operation signal.

Thereby, the amount of light incident to the CCD imager 3 increases or decreases to adjust the luminance of the image signal outputted from the CCD imager 3.

In such a multi-scan type image sensing device as explained above, if the frequency of the system clock supplied externally is different, accumulation time for charges generated in the CCD imager 3 is also different and therefore the image having adequate luminance cannot be obtained. Namely, when the period of system clock, for example, is extremely longer or shorter, a white image or a black image has been obtained.

Therefore, as a method of obtaining the image having adequate luminance, a method for adjusting an electronic shutter has been proposed, in which the manual iris adjusting mechanism 51 is operated to adjust luminance of the image signal outputted from the CCD imager 3 or to discharge the charges generated in the CCD imager 3. This method, however, has a problem that such adjustment has been required for each change of frequency of the system clock.

Moreover, when the so-called auto-iris has been utilized, it has also been difficult to obtain the image having adequate luminance due to insufficient adjusting range since the adjusting range is usually limited to the range corresponding to the system clock with reference to use of the system clock having the predetermined and fixed period.

SUMMARY OF THE INVENTION

The present invention has been proposed under the background explained above and is intended to easily obtain the image having adequate luminance with a multi-scan type image sensing device.

The image sensing device of the present invention comprises a clock input means to which one of clock signals of a plurality of frequencies is inputted, a drive means for driving the image sensing element on the basis of the input clock signal, a detecting means for detecting frequency of the input clock signal, a discharge means for discharging charges generated in the image sensing element and a discharge control means for controlling the discharging means on the basis of the frequency of the clock signal detected by the detecting means.

Moreover, the method of adjusting the quantity of light of the present invention comprises the steps of inputting one of the clock signals of a plurality of frequencies, driving the image sensing element on the basis of the input clock signal, detecting the frequency of the input clock signal, discharging charges generated in the image sensing device and controlling the period for discharging on the basis of the frequency of the clock signal detected.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIGS. 6A to 6H are timing charts for explaining the processings of the chromaticness simultaneous processing circuit 7 of FIG. 1;

FIGS. 7A to 7F are timing charts for explaining operations of the gate circuit 15, integral circuit 16, gate circuit 17 and hold circuit 18 of FIG. 1;

FIGS. 8A and 8B are diagrams for explaining the operation principle of the auto-iris drive circuit 2 of FIG. 1;

DETAILED DESCRIPTION OF THE PREFERRED EMBODIMENTS

Figure 1:
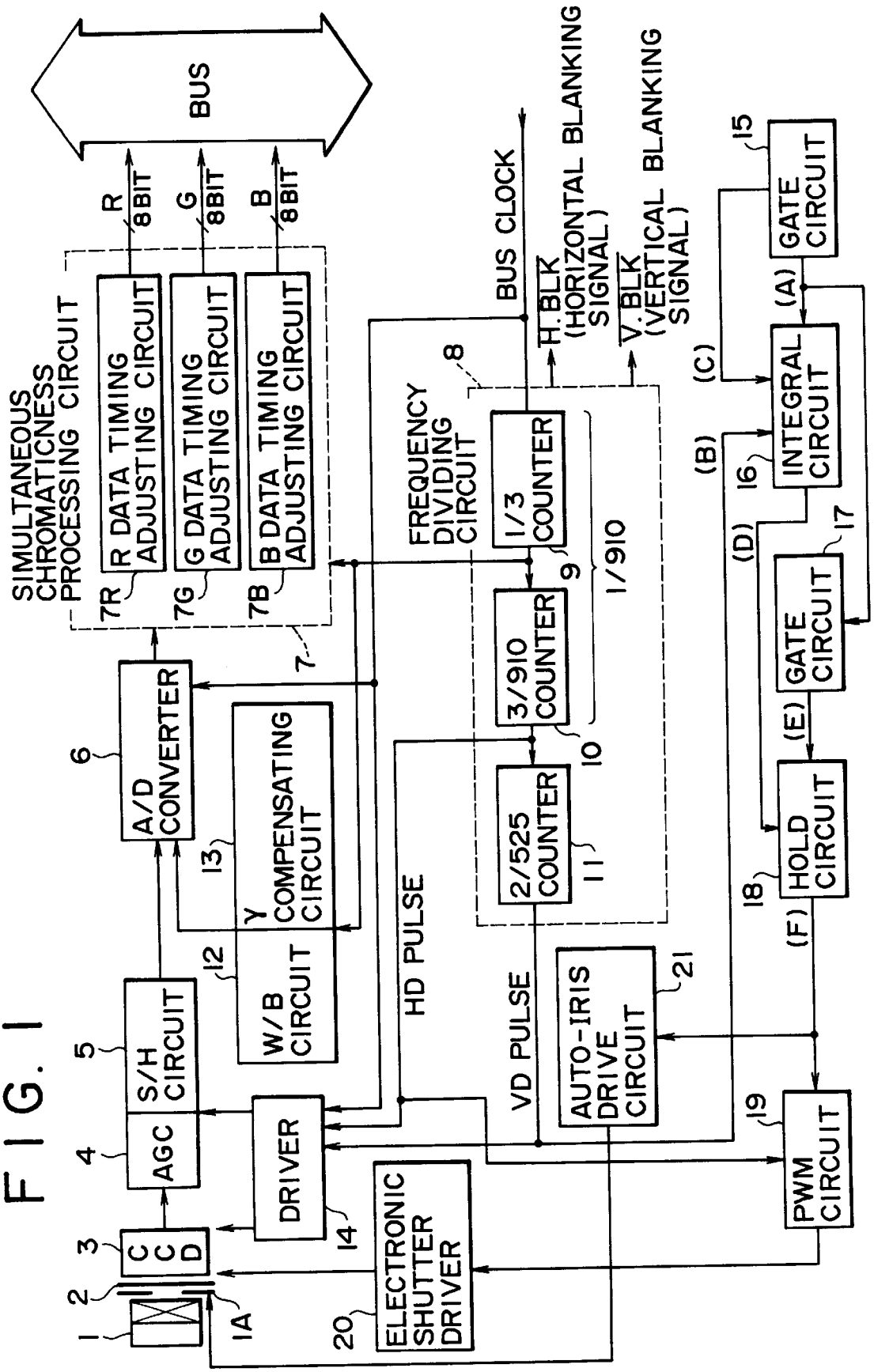
FIG. 1 is a block diagram illustrating a structure of one embodiment of the image sensing device to which the present invention is applied.
Figure 10:
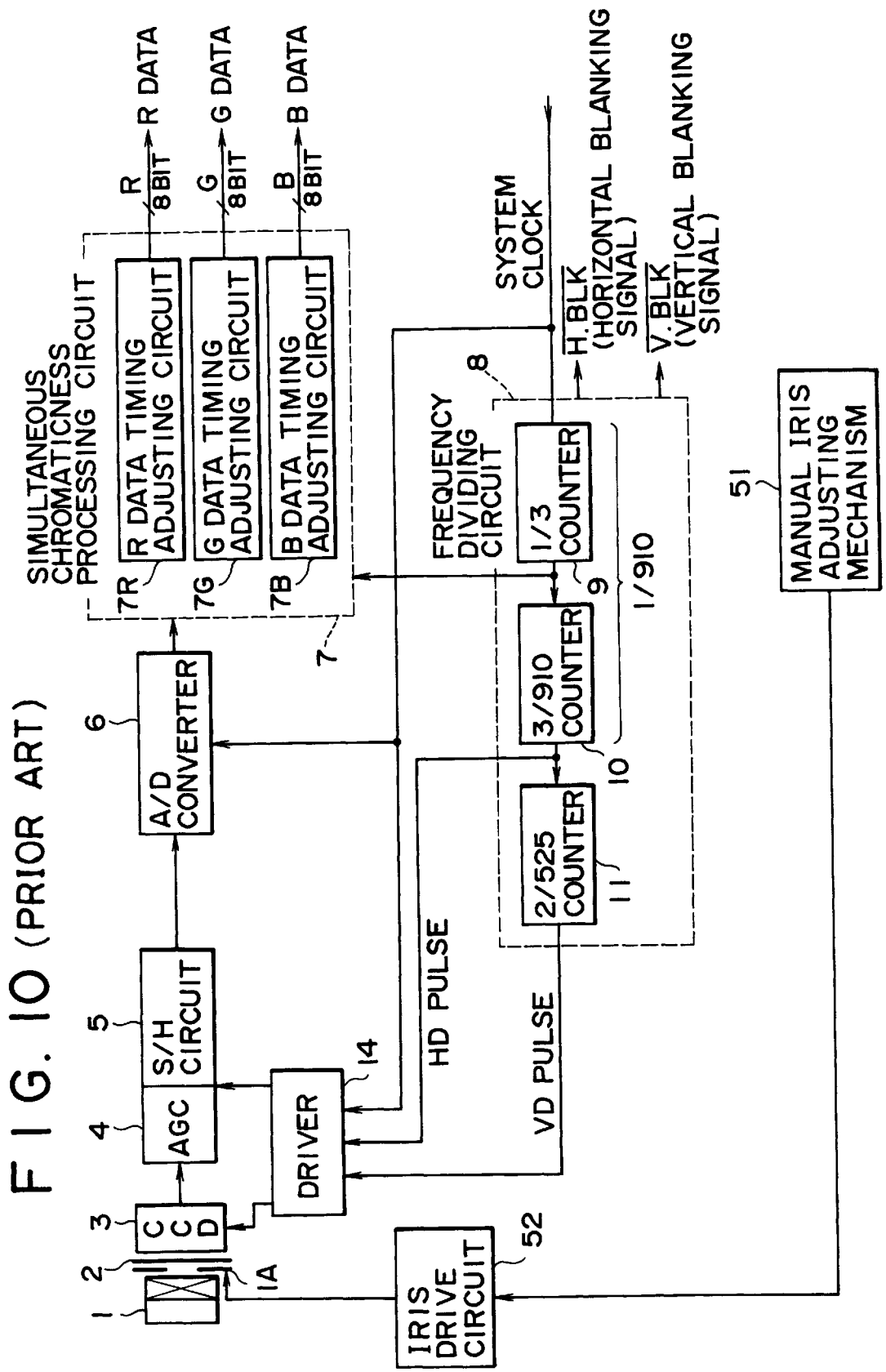
FIG. 10 is a block diagram illustrating an example of the structure of the image sensing device of the related art.

FIG. 1 illustrates a structure of one embodiment of an image sensing device to which the present invention is applied. In this figure, elements similar to those in FIG. 10 are designated by the similar reference numerals and explanation thereof will be omitted adequately.

The ⅓ system clock is supplied to a W/B (White/Balance) circuit 12 and a y compensating circuit 13 from a frequency dividing circuit 8 (counter 9). The W/B circuit 2 and y compensating circuit 13 change, depending on the ⅓ system clock, the reference voltage for A/D conversion in an A/D converter 6 and thereby to execute white balance adjustment or y compensation.

A gate circuit 15 repeatedly generates a gate pulse, which is H level for the predetermined fixed period $P_{ON}$ and L level for also the predetermined fixed period $P_{OFF}$ and output this pulse to an integral circuit 16 and a gate circuit 17. Moreover, the gate circuit 15 generates a pulse (hereinafter referred to as integral clear pulse) synchronized with the timing of the rising edge and then outputs this pulse to the integral circuit 16.

The gate pulse and integral clear pulse are supplied by the gate circuit 15 to the integral circuit 16 and in addition the VD pulse is also supplied thereto from a frequency dividing circuit 8 (counter 11). The integral circuit 16 is composed, for example, of a capacitor, a resistor and an operational amplifier. This integral circuit integrates the VD pulse inputted during the period where the gate pulse is in the H level and outputs the integrated value to a hold circuit 18. The integral circuit 16 clears (resets to 0) its integrated value in the timing where the integral clear pulse is supplied.

Here, the integral circuit 16 may also be composed, for example, of a counter, while it is composed of capacitor, resistor and operational amplifier as is explained above. In this case, the VD pulse is counted up with a counter and such count value is outputted as an integrated value of the VD pulse.

The gate circuit 17 generates a pulse (hereinafter referred to as hold transfer pulse) indicating, for example, the timing of falling edge of the gate pulse supplied from the gate circuit 15 and outputs such pulse to the hold circuit 18. The hold circuit 18 latches the integrated value outputted from the integral circuit 16 in the timing of the hold transfer pulse outputted from the gate circuit 17 and holds the latched integrated value until the next hold transfer pulse is received. The integrated value held in the hold circuit 18 is supplied to the PWM (Pulse Width Modulation) circuit 19 and auto-iris drive circuit 21.

To the PWM circuit 19, the HD pulse is supplied from the frequency dividing circuit 8 (counter 10), in addition to the voltage (integrated value) outputted from the hold circuit 18. And, the PWM circuit 19 generates, in synchronization with the HD pulse, the pulse (hereinafter referred to as shutter drive pulse) in the pulse width corresponding to the voltage outputted from the hold circuit 18 and outputs it to an electronic shutter driver 20. The electronic shutter driver 20 controls an electronic shutter 31 (FIG. 4) in the CCD imager 3 corresponding to the shutter drive pulse from the PWM circuit 19.

The auto-iris drive circuit 21 drives, as in the case of the auto-iris of the related art, an iris 1A to adjust quantity of light incident to the CCD imager 3 corresponding, for example, to the luminance of the image signal outputted from the CCD imager 3 and also shifts the range in quantity of light which can be adjustable by this iris 1A corresponding to the voltage outputted from the hold circuit 18.

In the image sensing device constituted as explained above, the multi-scan type image sensing is performed on the basis of the frequency of externally applied system clock. In this case, however, if each pixel in the CCD imager 3 is scanned with the frequency of system clock, namely if the system clock is used in direct as the clock (hereinafter referred to as pixel clock) for scanning the pixels, following formula is set up among the system clock frequency $f_S$ or pixel clock frequency $f_K$, frame frequency $f_F$ and horizontal frequency $f_H$ of the image signal outputted from the CCD imager 3.

$$f_S = f_K = r \times m/n \times b/a \times f_H^2/f_F \qquad (1)$$

Figure 2:
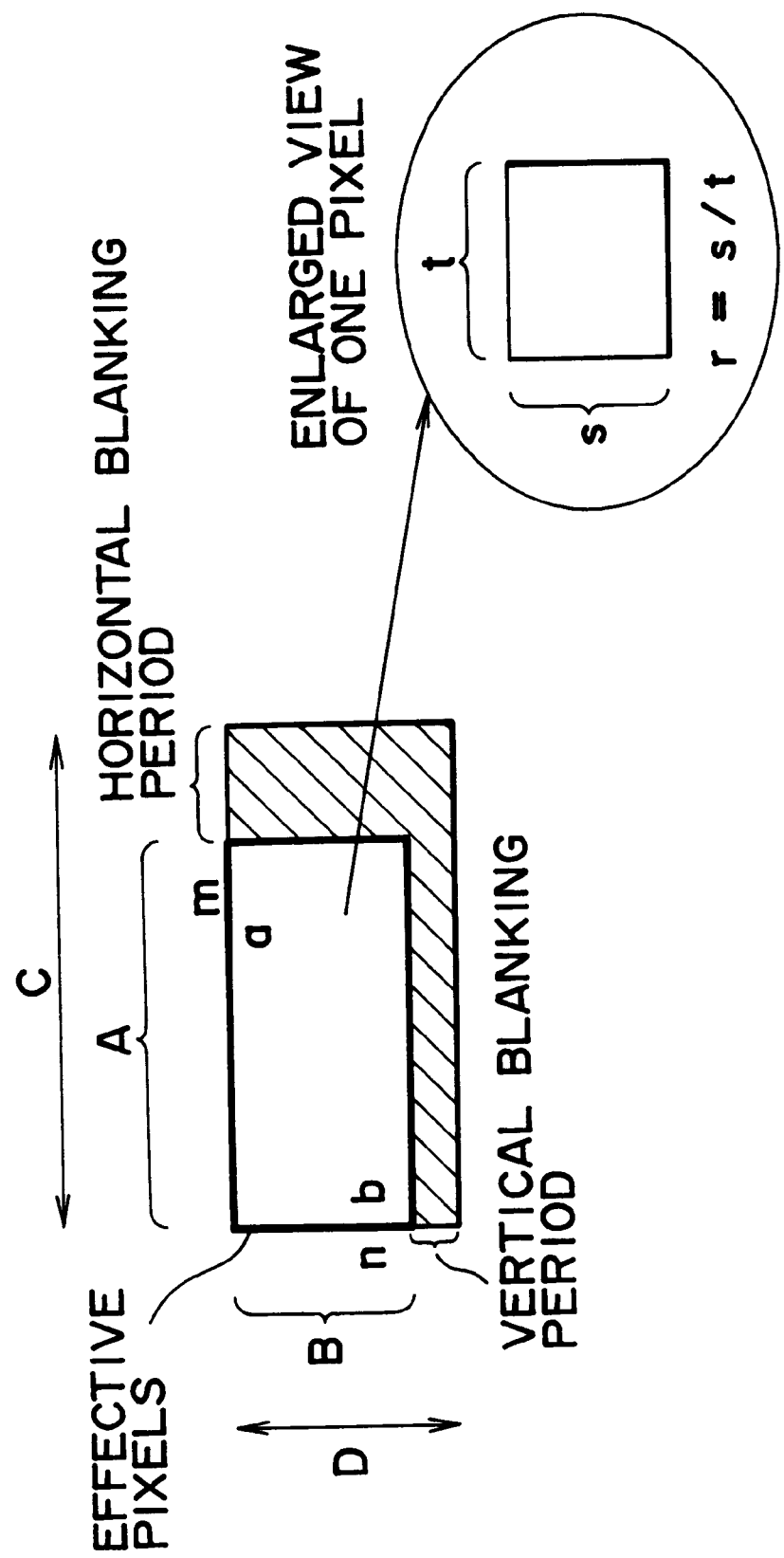
FIG. 2 is a diagram for explaining the relationship among system clock frequency, frame frequency and horizontal frequency.

However, as shown in FIG. 2, r indicates a ratio (hereinafter referred to as vertical and horizontal ratio of pixel) s/t of the vertical length (vertical direction) and horizontal length (horizontal direction) of one pixel, while m/n indicates an aspect ratio, namely a ratio A/B of the horizontal length (hereinafter referred to as horizontal CCD length) A of the range (the range enclosed by a thick line) and the vertical length (hereinafter referred to as vertical CCD length) B of the effective pixels of the CCD imager 3.

Moreover, when the number of pixels in the horizontal or vertical direction (respectively, hereinafter referred to as number of horizontal effective pixels or number of vertical effective pixels) among the pixels constituting the range of effective pixels are designated as $P_H$ or $P_V$ and the number of horizontal or vertical pixels (respectively, hereinafter referred to as number of horizontal pixels or number of vertical pixels forming an image signal) among the pixels constituting the range adding the horizontal and vertical blanking periods (hatched area in FIG. 2) to the range explained above are designated as C or D, a is indicated by the ratio $P_H/C$ (hereinafter referred to as horizontal effective ratio), while b by the ratio $P_V/D$ (hereinafter referred to as vertical effective ratio).

The number of horizontal effective pixels $P_H$ or number of vertical effective pixels $P_V$ are respectively indicated by the following formula.

$$P_H = a \times f_K/f_H$$

$$P_V = b \times f_H/f_F$$

Moreover, the horizontal length t or vertical length s of one pixel are respectively indicated by the following formula utilizing the number of horizontal effective pixels $P_H$ or number of vertical effective pixels $P_V$.

$$s = A/P_H$$

$$t = B/P_V$$

Figure 3:
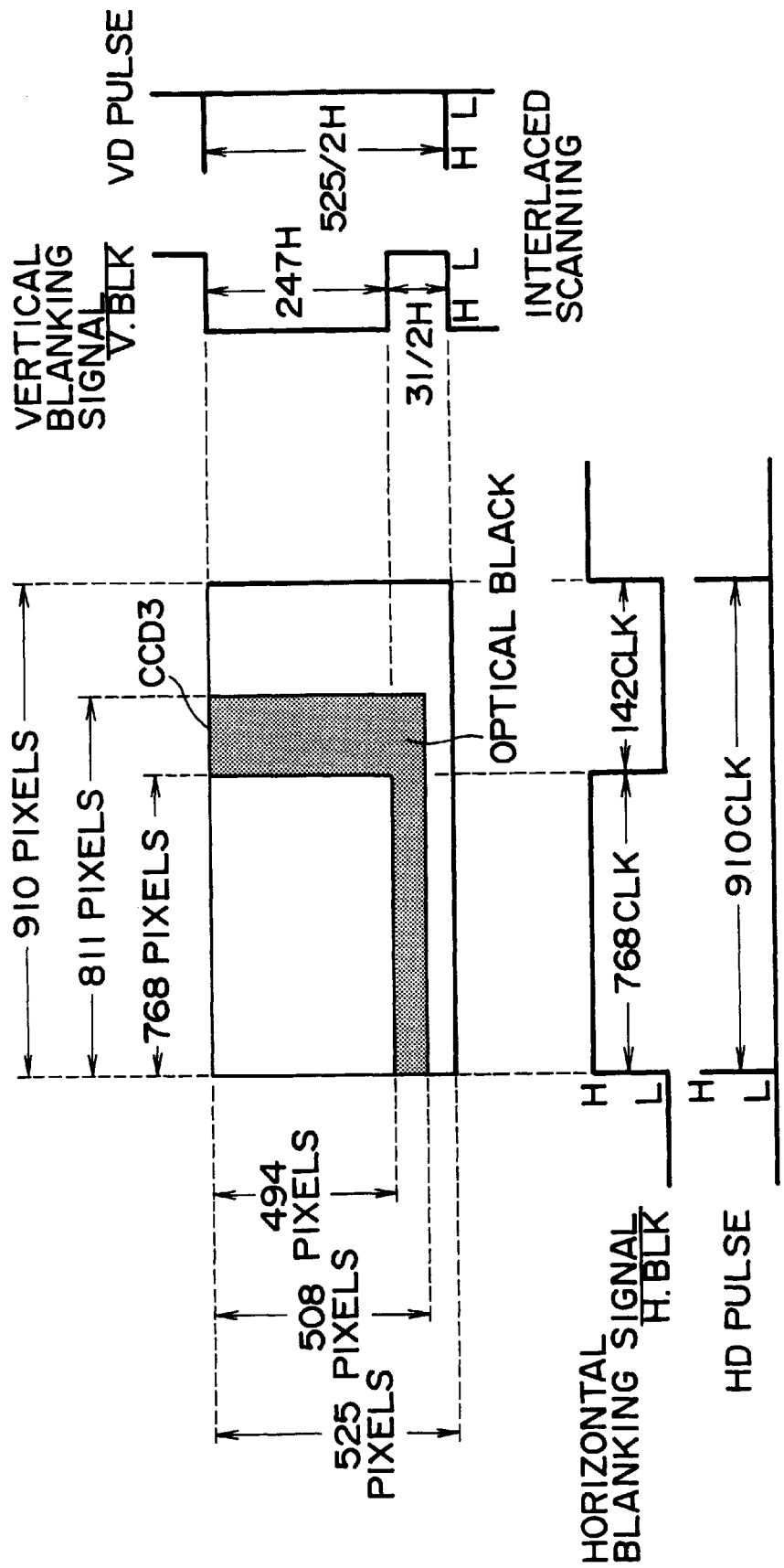
FIG. 3 is a diagram for explaining the specifications of a CCD imager 3 of FIG. 1.

Now, for example, as shown in FIG. 3, it is assumed that the horizontal direction of the CCD imager 3 is formed by 811 pixels, while the vertical direction is formed by 508 pixels (hereinafter described as 811×508) and the range of the effective pixels are indicted by 768×494($P_H$=768, $P_V$=494) (in this case, the CCD imager 3 is formed by about 4.1×105 pixels in total and its number of effective pixels is about 3.8×105 pixels). Moreover, vertical/horizontal ratio of pixels is also assumed as 1.660. In this case, the aspect ratio m/n becomes 4/3 and the horizontal effective ratio a or vertical effective ratio b becomes 84.395% or 94.100%, respectively.

Moreover, in this case, the horizontal blanking signal /H.BLK repeats H level only for the period, for example, of 768 system clocks and thereafter L level only for the period of 142 (=910−768) system clocks. Moreover, the HD pulse repeats the H level in the period of 910 clocks. In addition, if an image is assumed to be displayed with the interlaced scanning, the vertical blanking signal (/V.BLK) repeats H level only for the period, for example, of 247 (=494/2) lines and thereafter L level only for the 31/2 (=525/2−247) lines. Moreover, the VD pulse repeats H level in the 525/2 lines.

The image signal, namely, optical black outputted from the pixels (hatched area in FIG. 3) excluding the effective pixels 768×494 from the 811×508 pixels forming the CCD imager 3 is the reference for determining the black level of the image signal outputted from the CCD imager 3 and is used as the reference voltage (LSB (Least Significant Bit) basic voltage) of the A/D converter 6 (FIG. 1).

When the specifications of the CCD imager 3 are determined, for example, as explained above and moreover the frequency $f_S$ of the system clock is determined, the horizontal frequency $f_H$ and frame frequency $f_F$ (or field frequency) are also determined from the formula (1). Here, the horizontal frequency $f_H$ and frame frequency $f_F$ for the main system clock frequency $f_S$ are shown in Table 1, when the CCD imager 3 has the specifications as shown in FIG. 3.

TABLE 1

| System clock freq. $f_S$ (MHz) | Horizontal freq. $f_H$ (Hz) | Frame freq. $f_F$ (Hz) | |
|---|---|---|---|
| 6.0 | 6593 | 12.56 | |
| 8.0 | 8791 | 16.75 | ISA bus |
| 13.0 | 14285 | 27.21 | |
| 13.5 | 14835 | 28.26 | |
| 14.3182 | 15734 | 29.97 | NTSC 4 f sc |
| 15.0 | 16483 | 31.40 | |
| 30.0 | 32966 | 62.80 | PCI bus |

As will be understood from Table 1, when the system clock frequency $f_S$ is changed, the horizontal frequency $f_H$ and frame frequency $f_F$ as the scanning frequency for scanning the CCD imager 3 also change and the light irradiating time to the CCD imager 3 (accumulating time of charges generated by the CCD imager 3) also changes and thereby, as explained above, luminance of the image signal changes even if an object is picked up under the same environment.

Namely, FIG. 4 schematically shows a CCD imager 3. The CCD imager 3 receives the incident light with a photosensor 33 and generates charges corresponding to such quantity of light. This charge is accumulated in the part sandwiched by the voltage barriers due to the electronic shutter 31 and lead gate 32.

The electronic shutter 31 is usually open but is closed only for the predetermined period $T_{CLOSE}$ before accumulation of charges generated by the photosensor 33. Since the electronic shutter 31 is opened or closed as explained above, the CCD imager 3 discharges unwanted charges. Meanwhile, the lead gate 32 is usually closed and is opened only in such a timing as immediately before the period $T_{CHARGE}$ has passed where the electronic shutter 31 is opened next after the electronic shutter 31 is opened and the charges generated in the photosensor 33 is started to be accumulated. As explained, since the lead gate 32 is opened and closed, the CCD imager 3 transfers the charges accumulated during the period $T_{CHARGE}$ until the lead gate 32 is opened after the electronic shutter 31 is opened.

In the related art, the electronic shutter 31 and lead gate 32 are opened and closed in synchronization with the system clock frequency $f_S$, horizontal frequency $f_H$ and frame frequency $f_F$. Therefore the period $T_{CLOSE}$ for closing the electronic shutter 31 and the period T CHARGE for charging the charges are basically determined by the system clock frequency $f_S$ (therefore, horizontal frequency $f_H$ and frame frequency $f_F$).

Therefore, when the system clock frequency $f_S$ is the predetermined frequency in the CCD imager 3, the charge accumulating time is the predetermined time. Thereby, as shown in FIG. 4A, if the charges generated corresponding to quantity of light received are assumed to be accumulated in the adequate quantity at the area sandwiched by the potential barriers due to the electronic shutter 31 and lead gate 32, the charge accumulating time becomes longer than the predetermined time if the system clock frequency $f_S$ is lower than the predetermined frequency.

Figure 4A:
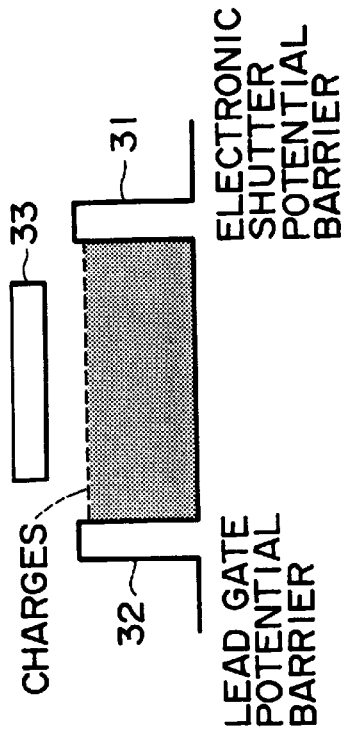
FIGS. 4A to 4D are diagrams for explaining the principle of the present invention.
Figure 4B:
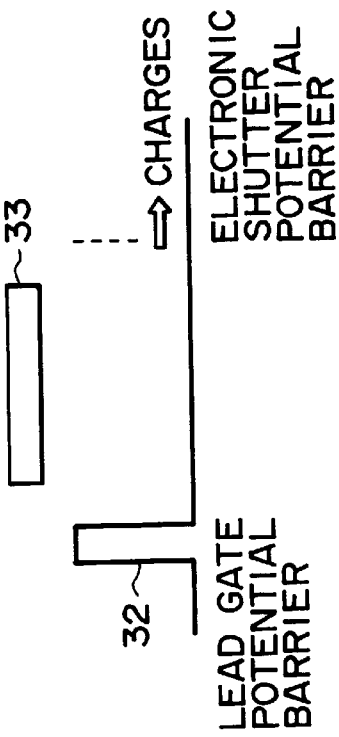

Accordingly, even when the intensity of light irradiating (incident to) the photosensor 33 is equal to that in FIG. 4A, quantity of charges generated and accumulated in the area sandwiched by the potential barriers due to the electronic shutter 31 and lead gate 32 becomes larger, as shown in FIG. 4B, than that in FIG. 4A.

Figure 4C:
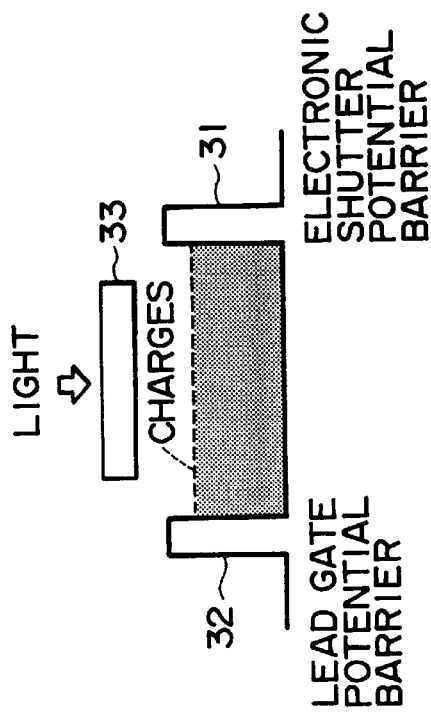

The charges accumulated in the area sandwiched by the potential barriers due to the electronic shutter 31 and lead gate 32 are transferred, as shown in FIG. 4C, when the lead gate 32 is opened and the charges transferred are converted into an image signal. Therefore, if an image signal of adequate luminance can be obtained as shown in FIG. 4A, an image signal of luminance higher than the adequate value can be obtained in the case of FIG. 4B.

Meanwhile, when the system clock frequency $f_S$ is higher than the predetermined frequency, the charge accumulating time becomes shorter than the predetermined time and as a result, an image signal of the luminance lower than the adequate value is obtained on the contrary to the case explained above.

Here, since the charging time $T_{CHARGE}$ changes, such luminance also changes due to the change of system clock frequency $f_S$. Therefore, when the such charging time $T_{CHARGE}$ is fixed to the adequate value, the image signal having adequate luminance can always be obtained.

Hence, the image sensing device shown in FIG. 1 controls the electronic shutter 31 so that the charging time $T_{CHARGE}$ is fixed to the predetermined adequate value even when the system clock frequency $f_S$ changes.

Figure 4D:
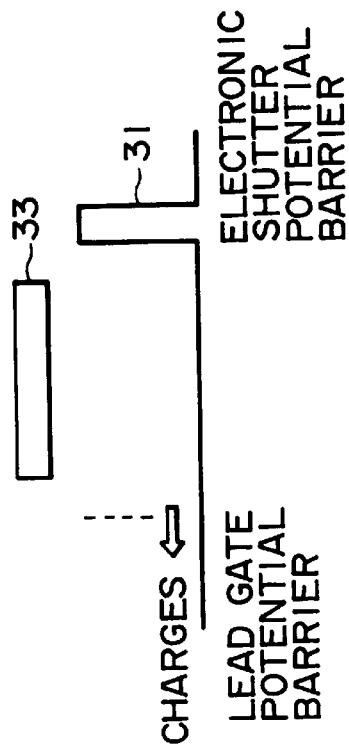

Namely, when the system clock frequency $f_S$ becomes high, both shutter 31 closing period $T_{CLOSE}$ and charging period $T_{CHARGE}$ have been shortened in the related art. Therefore, in such a case, as shown in FIG. 4D, the charging time $T_{CHARGE}$ is not shortened (not changed) by shortening the electronic shutter 31 closing period $T_{CLOSE}$. Moreover, when the system clock frequency $f_S$ becomes low, both electronic shutter 31 closing period $T_{CLOSE}$ and charging period $T_{CHARGE}$ have become longer in the related art. Therefore, in such a case, as shown in FIG. 4D, the charging period $T_{CHARGE}$ is not extended (not changed) by extending the electronic shutter 31 closing period $T_{CLOSE}$.

Next, operations of the image sensing device of FIG. 1 will be explained. As is explained in regard to FIG. 10, the light from an object to be picked up is received at the light receiving surface of the CCD imager 3 through the lens 1, iris 1A and primary colors vertical stripe filter 2 and thereby outputted as an image signal. This image signal is then supplied to the A/D converter 6 via AGC 4 and S/H circuit 5.

The A/D converter 6 executes the A/D conversion to the image signal, while changing the reference voltage, depending on the optical black included in this image signal and outputs of the W/B circuit 12 and y compensating circuit 13 and supplies the digital data (R data, G data, B data) obtained as a result to the chromaticness simultaneous processing circuit 7. The chromaticness simultaneous processing circuit 7 adjusts the output timing of the R data, G data and B data as explained previously.

Figure 5:
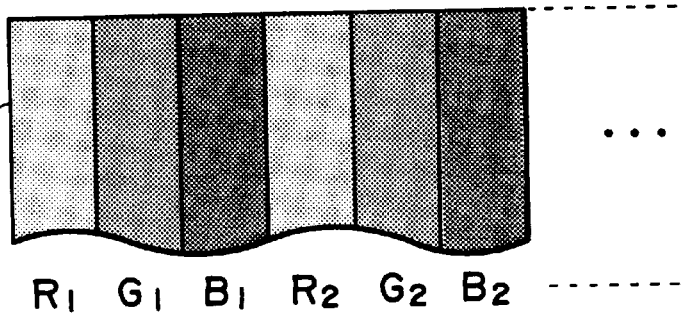
FIG. 5 is a diagram for illustrating an example of the structure of the primary colors vertical stripe filter 2 of FIG. 1.

Here, FIG. 5 shows an example of structure of the primary color vertical stripe filter 2. The primary color vertical stripe filter 2 is constituted by repeatedly forming the elongated narrow filters in the width about horizontal length t of pixel (FIG. 2) allowing only the light elements of red (R), green (G) and blue (B) to pass and this filter is arranged on the light receiving surface of the CCD imager 3 so that the direction extending in the elongated part is set orthogonal to the horizontal scanning direction. Therefore, when attention is paid to a certain horizontal scanning line, the CCD imager 3 outputs the image signal corresponding to the lights of red, green, blue, red, . . . in the timing of system clock.

The A/D converter 6 sequentially and repeatedly outputs the R data, G data and B data, for example, as shown in FIG. 6B because it executes the A/D conversion to the image signal in the timing of the system clock.

As explained in regard to FIG. 10, the ⅓ system clock is supplied to the chromaticness simultaneous processing circuit 7 from the frequency dividing circuit 8 (counter 9). Namely, when the system clock as shown in FIG. 6A, for example, is used, the ⅓ system clock obtained by dividing the frequency of such system clock to ⅓ as shown in FIG. 6C is supplied to the chromaticness simultaneous processing circuit 7.

The R data timing adjusting circuit 7R adjusts the ⅓ system clock shown in FIG. 6C to the clock (hereinafter referred to as R data sampling clock) for adjusting output of R data and latches the output of A/D converter (FIG. 6B) in the timing of this R data sampling clock. Thereby, the R data timing adjusting circuit 7R latches only the R data and outputs it. As a result, an output of the R data timing adjusting circuit 7R becomes the same R data, as shown in FIG. 6D, during the period from a certain R data sampling clock to the next R data sampling clock.

As shown in FIG. 6E, the G data timing adjusting circuit 7G generates the clock obtained by delaying the R data sampling clock by only one system clock as the clock (hereinafter referred to as G data sampling clock) for adjusting output of the G data and latches the output (FIG. 6B) of the A/D converter 6 in the timing of this G data sampling clock. Thereby, the G data timing adjusting circuit 7G latches and outputs only the G data. As a result, as shown in FIG. 6F, the output of the G data timing adjusting circuit 7G becomes the same G data during the period from a certain G data sampling clock to the next G data sampling clock.

In the same manner, as shown in FIG. 6G, the B data timing adjusting circuit 7B generates the clock obtained by delaying the G data sampling clock by one system clock as the clock (hereinafter referred to as B data sampling clock) for adjusting the output of B data and latches the output (FIG. 6B) of the A/D converter 6 in the timing of this B data sampling clock. Thereby, the B data timing adjusting circuit 7B latches and outputs only the B data. This output becomes the same B data during the period from a certain B data sampling clock to the next B data sampling clock as shown in FIG. 6H.

Therefore, during the period from latch of the B data in the B data timing adjusting circuit 7B to latch of the R data in the R data timing adjusting circuit 7R after the R data, G data are sequentially latched in the R data timing adjusting circuit 7R and G data timing adjusting circuit 7G, a set of R data, G data or B data is respectively outputted from the R data timing adjusting circuit 7R, G data timing adjusting circuit 7G or B data timing adjusting circuit 7B and the chromaticness simultaneous processing circuit 7 simultaneously outputs a set of the R data, G data and B data.

A set of the R data, G data and B data outputted from this chromaticness simultaneous processing circuit 7 is supplied to an external apparatus such as a personal computer via the bus.

On the other hand, a bus clock, for example, is supplied as the system clock from such personal computer. The frequency dividing circuit 8 generates, based on this system clock, the ⅓ system clock , HD pulse and VD pulse as explained above.

Here, the CCD imager 3 is constituted in this embodiment as explained regarding FIG. 3, the number of the horizontal pixels C and vertical pixels D forming the image signal are respectively 811 and 508 pixels. Moreover, in the CCD imager 3, an image signal can be outputted by the interlaced scanning. Therefore, as explained previusly, the HD pulse in the same period of the horizontal synchronous signal of the image signal outputted from the CCD imager 3 can be obtained by dividing the system clock 1/910 in the counters 9 and 10, and the VD pulse in the same period of the vertical synchronous signal of the image signal outputted from the CCD imager 3 can be obtained by dividing such HD pulse frequency to 2/525 in the counter 11.

The frequency dividing circuit 8 generates the ⅓ system clock, HD pulse and DV pulse and also generates the horizontal blanking signal /H.BLK and vertical blanking signal /V.BLK explained in regard to FIG. 3, depending on the number of effective pixels (768 ×494, in this embodiment as explained previously) of the CCD imager 3.

When the VD pulse is outputted from the frequency dividing circuit 8, the gate circuit 15, integral circuit 16, gate circuit 17 and hold circuit 18 detect the system clock frequency from this VD pulse. The PWM circuit 19 generates, based on such system clock frequency, the PWM pulse having the width for specifying the period $T_{CLOSE}$ for closing the electronic shutter 31, so as not to change the charging period $T_{CHARGE}$.

Namely, the gate circuit 15 repeatedly generates the gate pule which is H level during the predetermined fixed period $P_{ON}$ and is L level during the subsequent predetermined fixed period $P_{OFF}$ as shown in FIG. 7A and this gate pulse is then outputted to the integral circuit 16 and the gate circuit 17. Moreover, the gate circuit 15 generates, as shown in FIG. 7C, the integrated clear pulse synchronized with the timing of rising edge of the gate pulse and outputs this pulse to the integral circuit 16.

The integral circuit 16 integrates the VD pulse which is inputted while the gate pulse is H level and outputs such integrated value to the hold circuit 18. The integral circuit 16 clears its integrated value in the timing, for example, of falling edge of the integrated clear pulse (therefore, the integration period of the VD pulse in the integral circuit 16 is accurately defined as the period from the rising edge timing of the integrated clear pulse to the falling edge timing of the gate pulse, however, it is defined as the H level period of the gate pulse for simplification of explanation).

An integrated value of the integral circuit 16 when the VD pulse is, for example, as shown in FIG. 7B is shown in FIG. 7D. During the period where the gate pulse is L level, the integrated value shown in FIG. 7(D) is lowered because of, for example, the natural discharge.

On the other hand, the gate circuit 17 generates a hold transfer pulse, as shown in FIG. 7E, to indicate the falling edge timing of the gate pulse supplied from the gate circuit 15 and outputs this signal to the hold circuit 18. The hold circuit 18 latches the integrated value (FIG. 7D) outputted from the integral circuit 16, for example, in the rising edge timing of the hold transfer pulse.

The integrated value latched by the hold circuit 18 is held until the rising edge timing of the next hold transfer pulse. Since the integrated value held by the hold circuit 18 can be obtained by integrating the VD pulse for the fixed period $P_{ON}$, the system clock frequency changes and thereby the value becomes constant as shown in FIG. 7F, unless the period of VD pulse (FIG. 7B) changes.

Namely, on the contrary, when the system clock frequency changes and thereby the period of VD pulse changes, the number of VD pulses in the fixed period $P_{ON}$ increases or decreases, resulting in a change of the integrated value held by the hold circuit 18. In more practical terms, when the system clock frequency becomes high, thereby shortening the period of VD pulse, the number of VD pulses in the fixed period $P_{ON}$ increases, allowing increase of the integrated value held by the hold circuit 18. Moreover, when the system clock frequency becomes low, thereby extending the period of the VD pulse, the number of VD pulses in the fixed period $P_{ON}$ decreases, resulting in decrease of the integrated value held by the hold circuit 18.

Therefore, in the gate circuit 15, integral circuit 16, gate circuit 17 and hold circuit 18, the system clock frequency is detected in the form of a voltage which is equal to the integrated value held by the hold circuit 18 (detected by executing the so-called frequency—voltage conversion).

The integrated value held by the hold circuit 18 is supplied to the PWM circuit 19. In the PWM circuit 19, the integrated value held by the hold circuit 18, namely the shutter drive pulse corresponding to the system clock frequency is generated in synchronization with the HD pulse from the frequency dividing circuit 8.

In practice, the PWM circuit 19 respectively generates the shutter drive pulse shorter or longer than that of the related art when the integrated value held by the hold circuit 18 is smaller or larger, namely when the system clock frequency is higher or lower. This shutter drive pulse is supplied to the electronic shutter driver 20, which closes the electronic shutter 31 of the CCD imager 3 during the period corresponding to the shutter drive pulse. Thereby, the period $T_{CLOSE}$ where the electronic shutter 31 is closed becomes shorter than that of the related art when the system clock frequency becomes higher. Moreover, when the system clock frequency is lowered, the period $T_{CLOSE}$ becomes longer than that of the related art. As a result, the charging period $T_{CHARGE}$ is fixed without relation to the system clock frequency.

Thereby, a user can easily obtain the image of the adequate luminance.

Next, the system clock frequency indicated by the integrated value held by the hold circuit 18 is also supplied to the auto-iris drive circuit 21 in addition to the PWM circuit 19. Like the auto-iris in the related art, the auto-iris drive circuit 21 drives iris 1A to adjust the quantity of light incident to the CCD imager 3 corresponding to the luminance of the image signal outputted from the CCD imager 3.

Here, when luminance of the image is adjusted by the electronic shutter 31, if the range of the luminance (namely, quantity of light incident to the CCD imager 3) which can be adjusted by iris 1A driven by the auto-iris drive circuit 21 is set, for example, to the range indicated as the hatched area in FIG. 8A, the luminance adjusting position of electronic shutter 31 is located, for example as shown in FIG. 8B by the arrow mark, to the area near the end part of the luminance range adjustable by the iris 1A or to the area outside the luminance range adjustable by the iris 1A.

In such a case, it is impossible to adequately adjust luminance or contrast of image with the iris 1A.

Therefore the auto-iris drive circuit 21 recognizes the luminance adjusting position by the electronic shutter 31 on the basis of the system clock frequency indicated by the integrated value held by the hold circuit 18 and shifts the range of luminance adjustable by the iris 1A so that its neutral point matches the luminance adjusting position by the electronic shutter 31 as indicated in FIG. 8B. In this case, since the distance $R_L$ or $R_H$ up to the left end or right end of the luminance range adjustable by the iris 1A from the luminance adjusting position by the electronic shutter 31 becomes equal with each other, namely the dynamic range $R_L$ which can reduce the luminance with auto-iris 1A becomes equal to the dynamic range $R_H$ which can increase the luminance, the luminance and contrast of the image can adequately be adjusted by the iris 1A.

Figure 9:
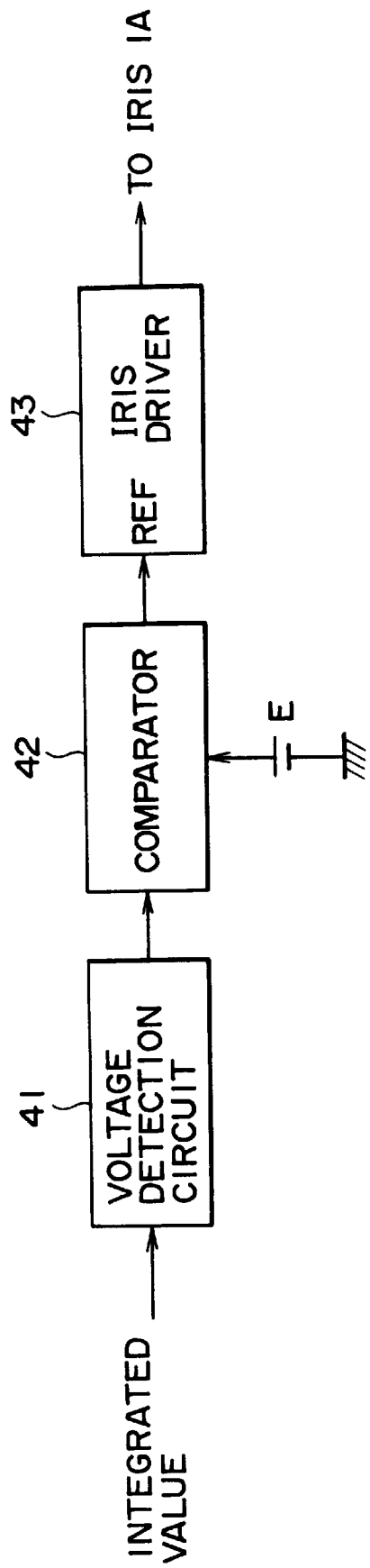
FIG. 9 is a block diagram illustrating an example of the structure of the auto-iris drive circuit 21 of FIG. 1.

FIG. 9 shows an example of structure of the auto-iris drive circuit 21 which can adjust luminance by the iris 1A as explained above. The integrated value held by the hold circuit 18 is supplied to a voltage detecting circuit 41. In this voltage detecting circuit 41, its integrated value, namely, a voltage corresponding to the system clock frequency is detected and is then supplied to a comparator. In the comparator 42, the voltage detected by the voltage detecting circuit 41 is compared with the predetermined reference voltage E and its difference value is then supplied to a reference terminal of the iris driver 43.

The iris driver 43 shifts the range of luminance adjustable by the iris 1A corresponding to the voltage (hereinafter referred to as the reference voltage) inputted to the reference terminal of the iris driver 43 and also drives the iris 1A within such range. Thereby, the range of luminance adjustable by the iris 1A is shifted as explained regarding FIG. 8 so that its neutral point matches the luminance adjusting position by the electronic shutter 31 and the iris 1A is driven like the related art in the shifted range.

Shift of the luminance adjustable range by the iris is also possible in a certain apparatus of the related art, but such shift of the luminance adjustable range by the iris in the image sensing device of the related art requires change of the reference voltage applied to a block corresponding to the iris driver 43 explained above by opening the package of apparatus. This work is, however, difficult for an ordinary user who is not familiar with the technique and is also troublesome for those who are skilled in this art. The image sensing device shown in FIG. 1 can shift the range of luminance adjustable by the iris 1A to the adequate range without any such difficult work.

The image sensing device to which the present invention is applied has been explained above, but such image sensing device can also be applied, for example, to a video camera for sensing a moving image or to a still camera for sensing a stationary image and moreover to image scanner, barcode reader and OCR (Optical Character Recognition) reader, etc.

In this embodiment, an image is picked up by the CCD imager 3, but the present invention can also be applied to an apparatus using a device, other than the CCD imager, which receives the light, generates charges corresponding to quantity of light received and outputs an image signal corresponding to such charges.

Moreover, in this embodiment, luminance is adjusted by both electronic shutter 31 and iris 1A, but luminance can naturally be adjusted by only one means.

Meanwhile, luminance can also be adjusted by adjusting the light emitted from a light source (for example, light source comprised in the case of an image scanner, or lighting irradiating an object in the case of a video camera) for irradiating the object, corresponding to the system clock frequency.

In this embodiment, the specifications of the CCD imager 3 have been determined as explained regarding FIG. 3, but these specifications are not limited thereto. However, it may be required to change the frequency dividing ratio in the frequency dividing circuit 8 depending on the specifications of the CCD imager 3.

The present invention can also be applied to the image sensing using visible light and also to that utilizing, for example, infrared ray and X-ray, or the like.

According to the image sensing device and method of adjusting quantity of light of the present invention, the clock frequency for driving the image sensing means is detected and a discharge means for discharging the charges generated by the image sensing means is controlled corresponding to the clock frequency. Therefore, an image having adequate luminance can be obtained easily corresponding to the clock frequency to drive the image sensing means.

Although preferred embodiment of the present invention has been described and illustrated, it will be apparent to those skilled in the art that various modifications may be made without departing from the principles of the invention.

What is claimed is:

1. An image sensing device having an image sensing element for generating charges corresponding to a quantity of received light, comprising:

clock inputting means to which is input one of a plurality of input clock signals having a respective plurality of frequencies and producing therefrom an output clock signal;

driving means for driving said image sensing element based on said output clock signal inputted thereto;

detecting means for detecting a frequency of said output clock signal inputted to said driving means;

discharging means for discharging charges generated in said image sensing element; and discharge control means for controlling said discharging means on the basis of the frequency of said output clock signal detected by said detecting means, wherein said discharge control means controls said discharging means to discharge for a first period or a second period, where said first period is shorter than said second period, when the frequency of said clock signal detected by said detecting means is high or low, respectively.

2. The image sensing device as set forth in claim 1, wherein said detecting means detects the frequency of the output clock signal by counting during a predetermined period.

3. The image sensing device as set forth in claim 2, wherein said detecting means comprises pulse generating means for generating a pulse having a fixed pulse width t and integral means for integrating said output clock signal for a period of the fixed pulse width t.

4. The image sensing device as set forth in claim 3, wherein said discharge control means comprises pulse width modulating means for modulating an input pulse width on the basis of an integration result of said integral means.

5. An image sensing device having an image sensing element for generating charges corresponding to a quantity of received light, comprising:

clock inputting means to which is input one of a plurality of input clock signals having a respective plurality of frequencies and producing therefrom an output clock signal;

driving means for driving said image sensing element based on said output clock signal inputted thereto;

detecting means for detecting a frequency of said output clock signal inputted to said driving means;

discharging means for discharging charges generated in said image sensing element; and discharge control means for controlling said discharging means on the basis of the frequency of said output clock signal detected by said detecting means, wherein said detecting means detects the frequency of the output clock signal by counting during a predetermined period, and said detecting means comprises pulse generating means for generating a pulse having a fixed pulse width t and integral means for integrating said output clock signal for a period of the fixed pulse width, and wherein said discharge control means comprises pulse width modulating means for modulating an input pulse width on the basis of an integration result of said integral means, and said pulse width modulating means provides a first pulse width or a second pulse width, where said first pulse width is shorter than said second pulse width, when the integration result of said integral means is large or small, respectively, wherein said pulse width modulating means provides first pulse width or a second pulse width, where said first pulse width is shorter than said second pulse width, when the integration result of said integral means is large or small, respectively.

6. The image sensing device as set forth in claim 1, further comprising:

adjusting means for adjusting a quantity of light incident to said image sensing element; and adjusting range control means for controlling a range of said quantity of light adjustable by said adjusting means in response to the frequency of said output clock signal detected by said detecting means.

7. An image sensing device having an image sensing element for generating charges corresponding to a quantity of received light, comprising:

clock inputting means to which is input one of a plurality of input clock signals having a respective plurality of frequencies and producing therefrom an output clock signal;

driving means for driving said image sensing element based on said output clock signal inputted thereto;

detecting means for detecting a frequency of said output clock signal inputted to said driving means;

discharging means for discharging charges generated in said image sensing element;

discharge control means for controlling said discharging means on the basis of the frequency of said output clock signal detected by said detecting means;

adjusting means for adjusting a quantity of light incident to said image sensing element; and adjusting range control means for controlling a range of said quantity of light adjustable by said adjusting means in response to the frequency of said output clock signal detected by said detecting means, wherein said detecting means comprises pulse generating means for generating a pulse having a fixed pulse width and integral means for integrating said output clock signal inputted thereto for a period of the fixed pulse width, and said adjusting range control means sets a neutral point of the range of quantity of light adjustable by said adjusting means on the basis of a difference between an integration result from said integral means and a predetermined reference value.

8. A method of adjusting a quantity of light incident to an image sensing element for generating charges corresponding to the quantity of received light, comprising the steps of:

inputting one clock signal among clock signals having a plurality of respective different frequencies;

driving said image sensing element on the basis of said one input clock signal input in said step of inputting;

detecting the frequency of said input clock signal discharging charges generated in said image sensing element; and controlling a period for said step of discharging charges on the basis of the frequency of said input clock signal detected in said step of detecting, wherein said step of controlling includes setting the discharging period to be shorter or longer when the frequency of said clock signal detected is high or low, respectively.

9. The method of adjusting a quantity of light as set forth in claim 8, wherein said step of detecting the frequency of the input clock signal includes counting up said input clock signal within the predetermined period.

10. The method of adjusting a quantity of light as set forth in claim 8, wherein a movable range of an adjusting member arranged in front of said image sensing element to adjust the quantity of incident light is controlled on the basis of the frequency of said clock signal detected in said step of detecting.

* * * * *